United States Patent
Sanders et al.

(10) Patent No.: US 8,386,409 B2
(45) Date of Patent: Feb. 26, 2013

(54) SYSLOG MESSAGE ROUTING SYSTEMS AND METHODS

(75) Inventors: Daniel Spaugh Sanders, Orem, UT (US); John Paul Gassner, Alexandria, VA (US); David Gordon Corlette, Washington, DC (US)

(73) Assignee: EMC Corporation, Hopkinton, MA (US)

( * ) Notice: Subject to any disclaimer, the term of this patent is extended or adjusted under 35 U.S.C. 154(b) by 908 days.

(21) Appl. No.: 12/495,698

(22) Filed: Jun. 30, 2009

(65) Prior Publication Data

US 2010/0293128 A1    Nov. 18, 2010

Related U.S. Application Data

(60) Provisional application No. 61/177,569, filed on May 12, 2009.

(51) Int. Cl.
*G06N 5/02* (2006.01)
*G06F 15/173* (2006.01)
(52) U.S. Cl. .......................................................... 706/48
(58) Field of Classification Search .................... 706/48; 709/238
See application file for complete search history.

(56) References Cited

U.S. PATENT DOCUMENTS

| | | | |
|---|---|---|---|
| 2006/0098652 | A1 | 5/2006 | Singh et al. |
| 2009/0119307 | A1* | 5/2009 | Braun et al. .................. 707/100 |

FOREIGN PATENT DOCUMENTS

WO    0029924 A2    5/2000

OTHER PUBLICATIONS

EP Extended Search Report dated Jul. 5, 2010, Corresponding to European Application No. 10161223.

* cited by examiner

*Primary Examiner* — Jeffrey A Gaffin
*Assistant Examiner* — Ola Olude Afolabi
(74) *Attorney, Agent, or Firm* — Barry N. Young (57) ABSTRACT

A syslog message routing system can include multiple syslog sources, a syslog message routing module, and multiple syslog parsers. The syslog message routing module can receive a syslog message from one of the syslog sources, identify a particular syslog parser to handle the syslog message, and send the syslog message to the selected syslog parser. The syslog message routing module can identify the syslog parser by applying at least one of an application ID-based policy, a unique pattern matching rule policy, and a universal syslog parser policy.

20 Claims, 9 Drawing Sheets

SYSLOG MESSAGE ROUTING SYSTEMS AND METHODS

CROSS-REFERENCE TO RELATED APPLICATIONS

This application claims the benefit of U.S. Provisional Patent Application Ser. No. 61/177,569, titled "SYSLOG MESSAGE ROUTING SYSTEMS AND METHODS," filed on May 12, 2009, which is hereby incorporated by reference in its entirety herein.

TECHNICAL FIELD

The disclosed technology pertains to syslog message routing, and more particularly to systems and methods that can include automatic identification of syslog parsers and routing of syslog messages to identified syslog parsers.

BACKGROUND

Syslog is a standardized logging format/protocol that is generally used in a wide variety of devices and operating systems to log events related to computer system management and security auditing. Syslog is a client/server protocol that usually includes a syslog sender sending a syslog message to a syslog receiver within an IP network. A typical syslog message is a small (i.e., less than 1 kilobyte) text message. The syslog protocol is generally supported by a wide variety of devices and receivers across multiple platforms and is often used to integrate log data from virtually any number of systems into a single data repository.

Syslog has become standardized within the syslog working group of the Internet Engineering Task Force (IETF). In 2001, the IETF published Request for Comments no. 3164 ("RFC 3164"), which is publicly available at http://www.ietf.org/rfc/rfc3164.txt. For UNIX and Linux systems, syslog is practically the de facto standard for such logging. Syslog is also commonly used in routers and firewalls.

Regulations driven by the Sarbanes-Oxley Act (SOX), the Payment Card Industry Data Security Standards (PCI DSS), the Health Insurance Portability and Accountability Act (HIPAA), and many others typically require organizations to implement systems that can collect and analyze logs from many different sources. Because of the wide use of syslog by many different kinds of devices and operating systems, log management systems must be capable of efficiently consuming, correlating, and analyzing syslog messages in order to be a viable solution in the marketplace.

One reason for syslog's popularity is its flexibility. For example, a typical syslog message is simply a text message having a header and a message body. However, because there is no widely accepted standard for the content or syntax of a syslog message body, there are at least as many variations of a syslog message body as there are devices configured to output syslog messages. This presents a significant challenge to companies that structure their products to provide log analysis and reporting capabilities. These products must be prepared to parse a myriad of formats in order to extract relevant event data and store it in a database in normalized form where it can be analyzed, correlated, reported, etc.

SUMMARY

Embodiments of the disclosed technology can include a syslog framework operable to automatically determine and configure an optimal syslog parser for a given syslog device based on the content of the syslog message itself, regardless of whether the syslog message is received directly from a syslog source or indirectly through a syslog relay.

In certain embodiments of the invention, each syslog parser can have embedded therein a syslog message routing policy. When new syslog parsers are installed, the syslog parsers can be programmed to automatically inject corresponding new syslog message routing policies into the system. The new syslog message routing policies can enable the system to select one of the new syslog parsers as the optimal syslog parser for certain classes of syslog devices.

Embodiments of the disclosed technology can include a system operable to auto-configure syslog relay devices. In such embodiments, the system can auto-configure multiple syslog parsers for syslog messages emitted by the syslog relay devices even though the data from the syslog relay appears to come from a single network source.

Embodiments of the disclosed technology can include a system operable to route syslog messages to an optimal syslog parser with minimal parsing overhead. In such embodiments, the system does not need to completely parse and understand a syslog message before identifying an optimal syslog parser and transferring the syslog message to the identified syslog parser.

In certain embodiments of the invention, the system can route syslog messages to a general purpose syslog parser. For example, the system can route a syslog message to a general purpose syslog parser if the system is unable to identify an optimal syslog parser or if the system identifies a syslog parser that has not yet been installed. This prevents the loss of syslog messages even if the requisite syslog parser is not installed or is otherwise unavailable for receiving the syslog message.

The foregoing and other features, objects, and advantages of the invention will become more readily apparent from the following detailed description, which proceeds with reference to the accompanying drawings.

DETAILED DESCRIPTION

As used herein, the terms "syslog parser" and "syslog collector" both describe a module that is operable to parse one or more syslog messages received from a particular type of syslog device. For example, a Cisco® syslog parser is typically able to parse syslog messages received from Cisco® routers. (Cisco is a registered trademark of Cisco Systems, Inc. and/or its affiliates in the U.S. and certain other countries.)

As used herein, the terms "syslog relay device" and "syslog relay" both describe a device that receives syslog messages from multiple syslog devices (which may include other syslog relays) and then forwards the syslog messages to a log management system or other devices that can receive syslog messages. Such syslog relay devices may rely on multiple syslog parsers/collectors to handle their syslog messages.

Syslog Messages

Syslog messages are typically received by a log management system over a User Datagram Protocol (UDP) or Transmission Control Protocol (TCP) connection. A well-formed syslog message (e.g., as defined by RFC 3164) is generally structured as follows:

[<priority>] Date HostName MessageBody where the syslog message header includes the <priority>, Date, and HostName parameters and the syslog message body includes MessageBody, which represents everything following the HostName parameter. The Date parameter indicates the date of the event and the HostName parameter indicates an identification of the originating syslog device (e.g., an IP address or a host name).

In certain implementations of the disclosed technology, as discussed in detail below, the system can use the information contained within the syslog message body to identify a syslog parser to which the syslog message should be sent.

While there is no official standard for the syntax of a syslog message body, implementations of the disclosed technology can take advantage of a convention that is used in many syslog message bodies. Syslog message bodies that use the referenced convention typically list an application identifier ("application ID") as the first item in the syslog message body. Some examples of such application IDs are as follows:

sshd
 sshd[1839]:
 % ASA-6-605005
 % PIX-6-302016
 inetd[161]:
 gconfd(root-28241):
 gdm(pam_unix)[2069]:
 /usr/sbin/cron:

Certain embodiments of the invention can include hard-coded rules the system can use to reduce the given application IDs to normalized application IDs. For example, the system can rely on such rules to reduce the application IDs "sshd [1839]:," "% ASA-6-606006," and "% PIX-6-302016" to "sshd," "ASA," and "PIX," respectively.

Many application IDs are unique to a particular kind of syslog device. For example, "ASA" and "PIX" application IDs are generally known to be unique to Cisco® syslog devices. In other words, a Cisco® syslog parser would typically understand how to parse such "ASA" and "PIX" messages.

Syslog Message Routing

Figure 1:
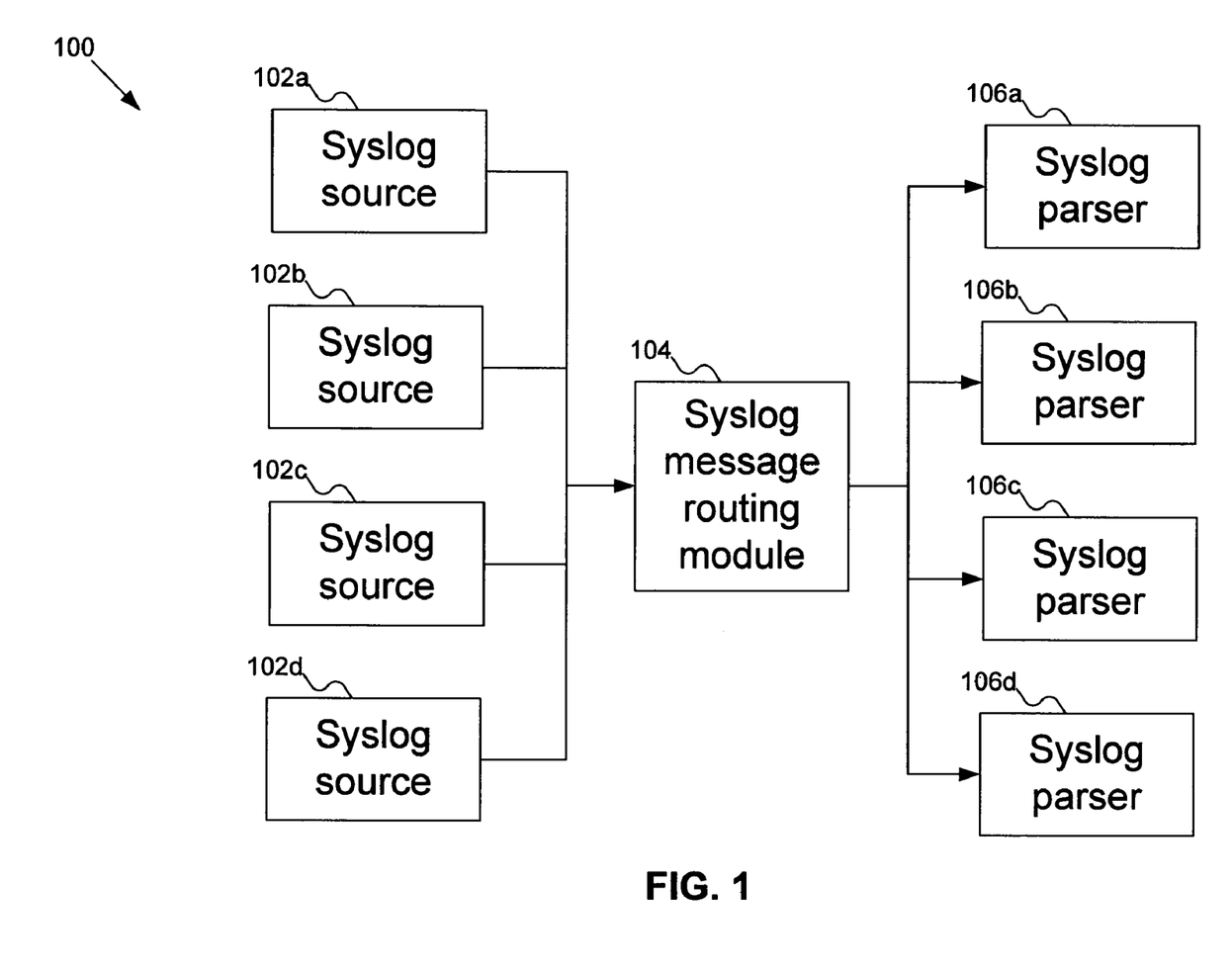
FIG. 1 is a block diagram illustrating a first example of a syslog message routing system in accordance with certain implementations of the disclosed technology.

FIG. 1 is a block diagram illustrating a first example of a syslog message routing system 100. The system 100 includes multiple syslog sources 102*a-d*, a syslog message routing module 104, and multiple syslog parsers 106*a-d*.

In the example, each of the syslog sources 102*a-d* sends syslog messages that, in order to be properly parsed, should each be sent to a particular one of the syslog parser 106*a-d*. For each syslog message sent by one of the syslog sources 102*a-d*, the syslog message routing module 104 can identify which of the syslog parsers 106*a-d* should receive the syslog message. Such identification can be performed in accordance with the techniques described herein. Once the system identifies the pertinent syslog parser, the system can send the syslog message to the identified syslog parser.

Figure 2:
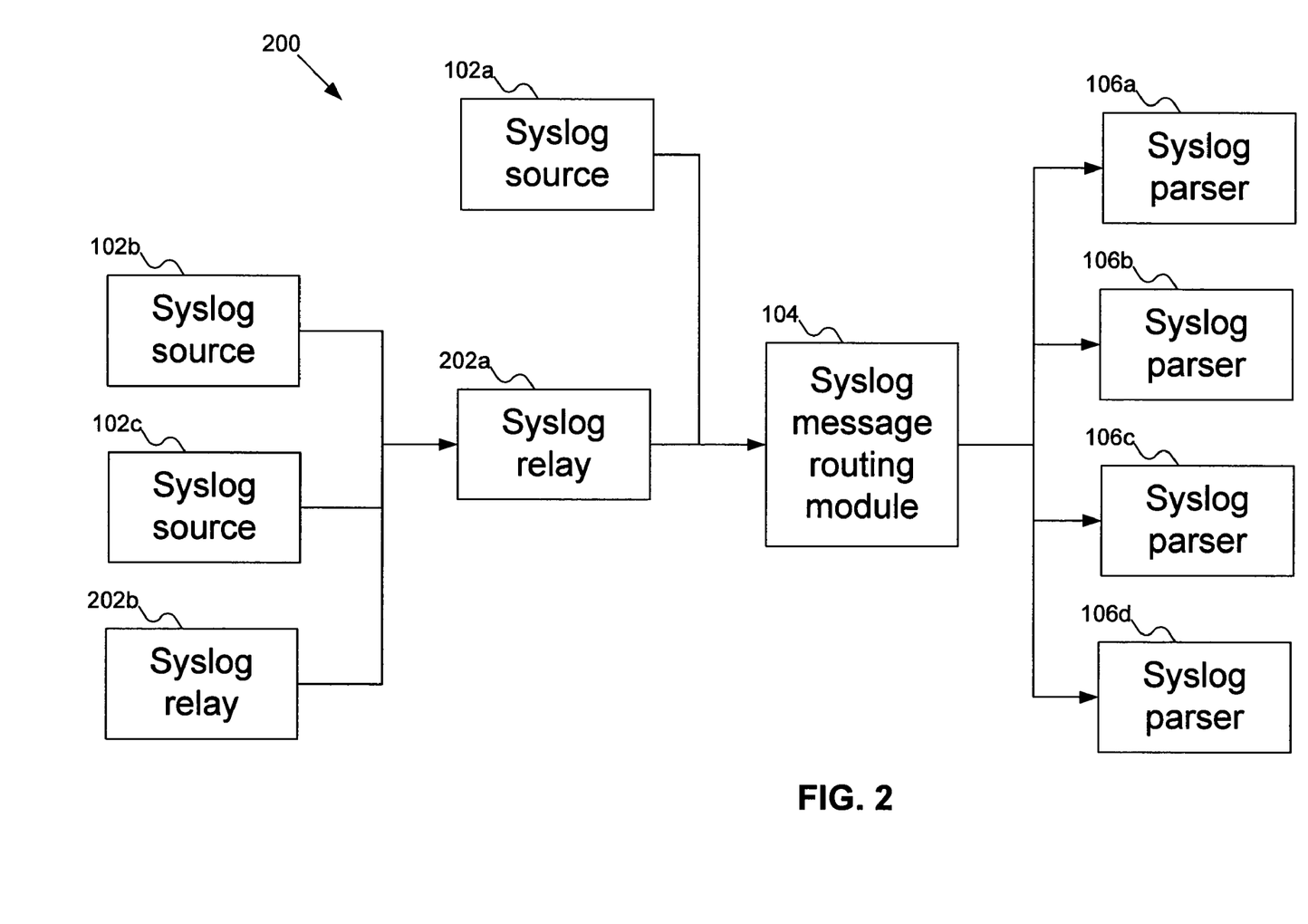
FIG. 2 is a block diagram illustrating a second example of a syslog message routing system in accordance with certain implementations of the disclosed technology.

FIG. 2 is a block diagram illustrating a second example of a syslog message routing system 200. The system 200 includes multiple syslog sources 102*a-c*, multiple syslog relays 203*a-b*, a syslog message routing module 204, and multiple syslog parsers 206*a-d*.

The system 200 is similar to the system 100 of FIG. 1 except for the addition of the syslog relays 202*a-b*. The first syslog relay 202*a* collects syslog messages from syslog sources 102*b* and 102*c*, and from the second syslog relay 202*b*. The second syslog relay 202*b* also collects syslog messages from other syslog sources (not shown). Thus, the syslog message routing module 104 receives various types of syslog messages from various types of syslog sources.

The syslog message routing module 104 can determine, for each syslog message received, which of the syslog parsers 106*a-d* should receive the message. Once the determination has been made, the syslog message routing module 104 can then transmit the message to the selected syslog parser.

Figure 3:
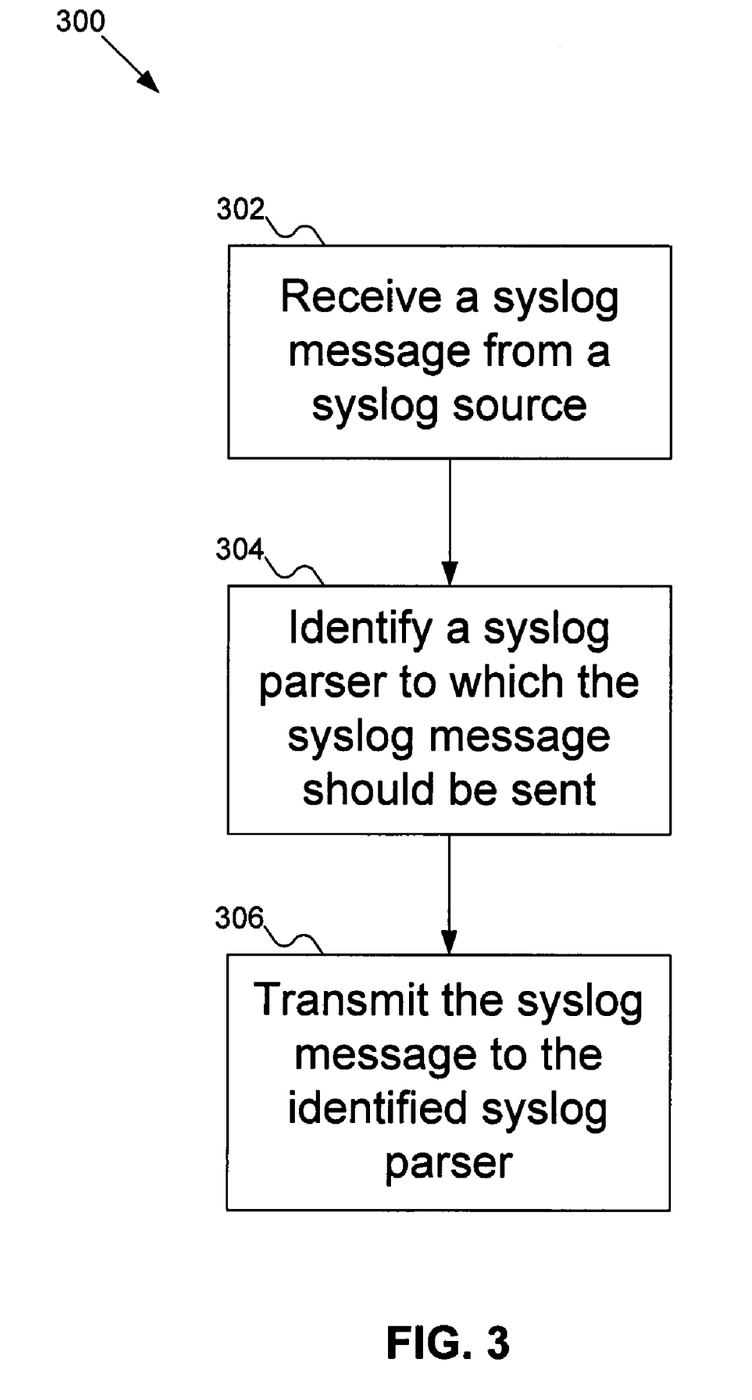
FIG. 3 is a flowchart illustrating a first example of a machine-controlled method of routing syslog messages to syslog parsers in accordance with certain implementations of the disclosed technology.

FIG. 3 is a flowchart illustrating a first example of a machine-controlled method 300 of routing syslog messages to syslog parsers.

At 302, the system receives a syslog message from a syslog source. For example, a syslog message routing module such as syslog message routing module 104 can receive a syslog message from one of many different syslog sources such as syslog sources 102*a-d* and syslog relays 202*a-b*.

At 304, the system can identify which syslog parser should receive the syslog message. For example, the system can identify the syslog parser best suited to handle the syslog message. Such identification can be made in accordance with any of the techniques described herein (or any combination thereof) and can be performed by a syslog message routing module such as syslog message routing module 104. For example, the system can apply one or more syslog message routing policies to the syslog message in order to identify an optimal syslog parser for the syslog message.

At 306, the system can send the syslog message to the selected syslog parser. For example, the syslog message routing module 104 can send the syslog message to one of the syslog parsers 106*a-d*. The designated syslog parser can then handle the syslog message (not shown).

Syslog Message Routing Policies

Embodiments of the disclosed technology can include some minimal parsing of a received syslog message in order to extract enough information to determine a particular syslog parser for handling the message. In such embodiments, installed syslog parsers can each provide a specific syslog message routing policy. Such a policy can provide the system with information that the system can use to determine what kinds of syslog messages should be sent to the corresponding syslog parser. While three types of syslog message routing policies are described below, one having ordinary skill in the art will appreciate that syslog message routing policies other than those described below can be used in connection with the disclosed technology.

Application ID-Based Policies

In embodiments involving application IDs that are unique to a particular syslog parser such as "ASA" and "PIX," a syslog parser can define a policy that lists the unique application IDs. An application ID-based policy can be specified using any of a wide variety of formats. In certain embodiments, the application ID-based policy can be a simple XML element as follows:

<Applications> PIX, ASA </Applications>

A syslog parser in accordance with the disclosed technology can provide a list of application IDs corresponding to specific types of syslog messages that the syslog parser is able to handle. In certain embodiments, the syslog parser can provide such a list to the system when the syslog parser is first installed. Thus, from that point on, the system can route syslog messages having such application IDs to the appropriate syslog parser. Also, the system can dynamically alter its behavior based on the installed syslog parsers and syslog message routing policies contained in the syslog parsers.

In situations where two syslog parsers each have a syslog message routing policy indicating an ability to handle a particular application ID, the system can select one of the syslog parsers in accordance with any of a number of techniques pertaining to prioritizing syslog parsers.

In certain embodiments of the invention, the system can identify a unique application ID within a syslog message and then determine which syslog parser should receive the syslog message based on the unique application ID. For example, if the system detects an "ASA" or "PIX" application ID, the system will know that the Cisco® syslog parser is the only installed syslog parser structured to handle the "ASA" and "PIX" application IDs and, as a result, send the syslog message to a Cisco® syslog parser.

While many application IDs are unique, however, there are other application IDs that are not unique. For example, application IDs such as "sshd" and "inetd," and "login" are emitted by most UNIX and Linux operating systems. In such situations, determining which syslog parser to use based on the application ID alone is typically impossible. Also, not every syslog message contains an application ID. Thus, in such situations, the system can apply other syslog message routing policies as discussed below.

Figure 4:
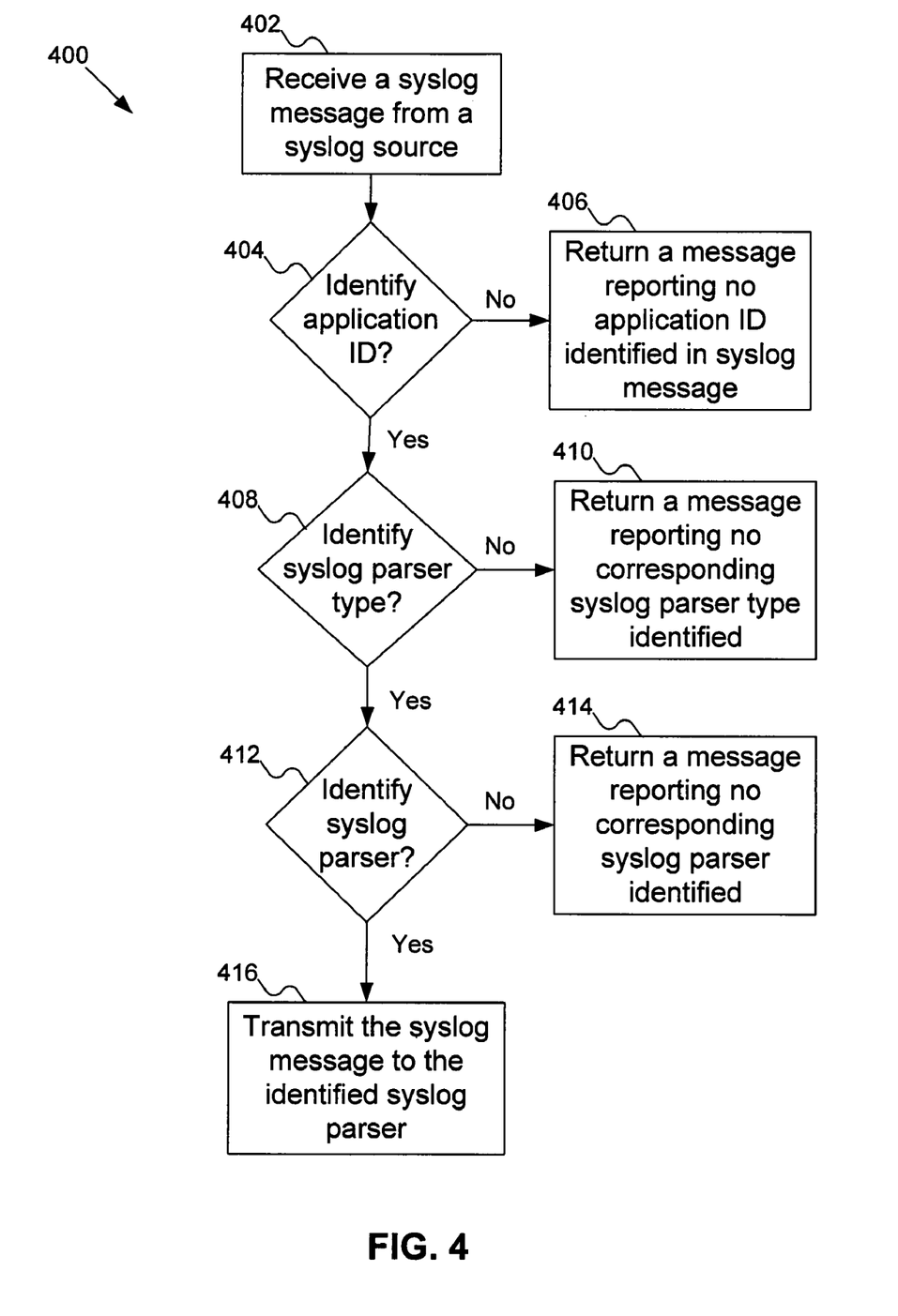
FIG. 4 is a flowchart illustrating a second example of a machine-controlled method of routing syslog messages to syslog parsers in accordance with certain implementations of the disclosed technology.

FIG. 4 is a flowchart illustrating a second example of a machine-controlled method 400 of routing syslog messages to syslog parsers. In the example, the machine-controlled method 400 includes the application of an application ID-based policy as described above.

At 402, the system receives a syslog message from a syslog source.

At 404, the system evaluates the syslog message to determine whether an application ID can be identified within the syslog message. For example, the system can begin by analyzing the first item located within the syslog message body (e.g. immediately after the syslog message header).

If the system is unable to identify an application ID within the syslog message, the system can return a message indicating that an application ID was not found within the syslog message, as shown at 406. At this point, the system can take other actions such as applying another syslog message routing policy (not shown) to the syslog message in order to identify a syslog parser to which the syslog message should be sent.

If the system does identify an application ID within the syslog message, however, the system can then apply an application ID policy by determining whether the identified application ID corresponds to a particular syslog parser type, as shown at 408.

If the system is unable to identify a syslog parser type that corresponds to the identified application ID, the system can return a message indicating that no corresponding syslog parser type was found, as shown at 410. At this point, the system can take other actions such as applying another syslog message routing policy (not shown) to the syslog message.

If the system does identify a syslog parser type that corresponds to the application ID, however, the system can then determine whether there is a particular syslog parser that corresponds to the identified parser type, as shown at 412.

If the system is unable to identify a particular syslog parser that corresponds to the identified syslog parser type, the system can return a message indicating that no corresponding syslog parser was found, as shown at 414. For example, the identification of a syslog parser type is not a guarantee that there is a syslog parser of that type that is presently connected to the system, let alone available to receive the syslog message. At this point, the system can take other actions such as applying another syslog message routing policy (not shown) to the syslog message.

If the system does identify a connected syslog parser that corresponds to the identified syslog parser type, however, the system can then send the syslog message to the identified syslog parser, as shown at 416.

"Unique Pattern Matching Rule" Policies

In certain embodiments of the invention, a syslog parser can specify a "unique pattern matching rule" policy. Such a policy can enable the system to match the syslog message body of one or more syslog messages to determine an appropriate syslog parser for a particular syslog device (e.g., as identified by the HostName field of the syslog message). The system can use any of a number of pattern matching rules. For example, the system can consider a series of regular expressions. In alternative embodiments of the invention, Java or other programming languages can allow for easy matching and conditional checking of one or more pattern matching rules. The system can apply such pattern matching rules to determine a suitable syslog parser.

In certain embodiments, the system can monitor a stream of syslog messages coming from a particular syslog device until the system detects a unique signature associated with a syslog message or series of syslog messages. The syslog message (or series of messages) can include information that is uniquely emitted by that type of syslog device. Once the system makes a pattern match for particular type of syslog device, the system can assign the syslog device to the syslog parser. The system can then route all subsequent syslog messages originating from the same syslog device (e.g., as identified by the HostName field of the syslog message) to the designated syslog parser. In such embodiments, the system would no longer need to attempt to pattern match syslog messages received from that syslog device to the unique pattern matching rules of other installed syslog parsers.

Consider an example in which a SuSE Linux system outputs the following message after a reboot:

January 12 00:48:22 host-832 reboot: The SLES 11 system rebooted. Because SuSE Linux boxes are the only types of devices that would output this kind of message, a SuSE Linux syslog parser in accordance with the disclosed technology can have a unique pattern matching rule that instructs the system to look for "reboot" and "SLES" strings in the syslog message body. In the example, once the system matches the "reboot" and "SLES" strings, the system can thereafter route any syslog messages received from the syslog device "host-832" to the SuSE Linux syslog parser.

In certain embodiments, however, the system will not apply a unique pattern matching rule policy to a syslog message if the system has already identified a syslog parser to which the syslog message should be sent. For example, if the system identifies a valid application ID in a syslog message that corresponds to a certain syslog parser, the system can send the syslog message to the identified syslog parser regardless of any pattern matching. However, if the system does not find an application ID within the syslog message or if the application ID is not valid, the system can then apply a unique pattern matching rule policy to the syslog message in an additional attempt to locate a proper syslog parser to which the syslog message can be sent.

Figure 5:
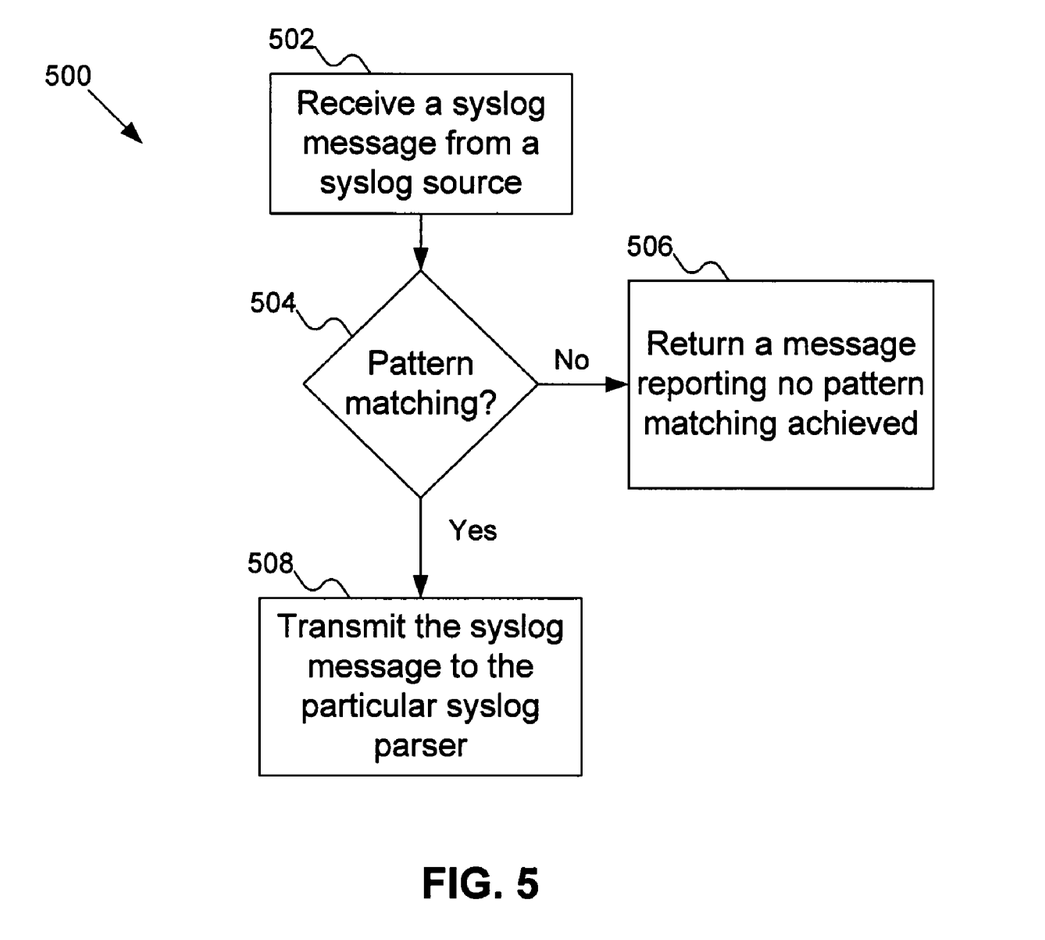
FIG. 5 is a flowchart illustrating a third example of a machine-controlled method of routing syslog messages to syslog parsers in accordance with certain implementations of the disclosed technology.

FIG. 5 is a flowchart illustrating a third example of a machine-controlled method 500 of routing syslog messages to syslog parsers. In the example, the machine-controlled method 500 includes the application of a unique pattern matching rule policy as described above.

At 502, the system receives a syslog message from a syslog source.

At 504, the system applies a pattern matching rule policy to the syslog message to determine whether a matching pattern can be identified within the syslog message. The system can implement any of a number of pattern matching techniques, as described above. For example, the system can evaluate the information within the syslog message body or analyze the structure of the syslog message body itself to identify a matching pattern that corresponds to a known or previously identified matching pattern that corresponds to a particular parser type based on the parser's policy.

If the system is unable to identify a matching pattern, and is thus unable to identify a particular syslog parser type based on a matching pattern, the system can return a message indicating that no pattern matching was achieved, as shown at 506. At this point, the system can take other actions such as applying another syslog message routing policy (not shown) to the syslog message in order to identify a syslog parser to which the syslog message should be sent. The system can also store any newly identified matching patterns for future use.

If the system does identify a particular matching pattern and thus a particular syslog parser corresponding to the identified matching pattern, however, the system can then send the syslog message to the identified syslog parser, as shown at 508.

"Universal Syslog Parser" Policies

In situations where the system does not identify a syslog parser by applying an application ID-based policy or by applying a unique pattern matching rule policy, for example, the system can apply a "universal syslog parser" policy in order to prevent a complete loss of the syslog message.

In certain embodiments, a universal syslog parser policy can be used to designate a particular syslog parser as being the "universal" syslog parser. For example, the universal syslog parser policy can simply include a true/false indicator of some kind that designates a "catch all" syslog parser. Such a syslog parser can be designed to be a last resort for handling all kinds of syslog messages not routed via application of other types of syslog message routing policies.

In certain embodiments, the universal syslog parser can be designed to perform minimal parsing (e.g., message header components only). For example, the system can simply send the syslog message as a block of text.

Figure 6:
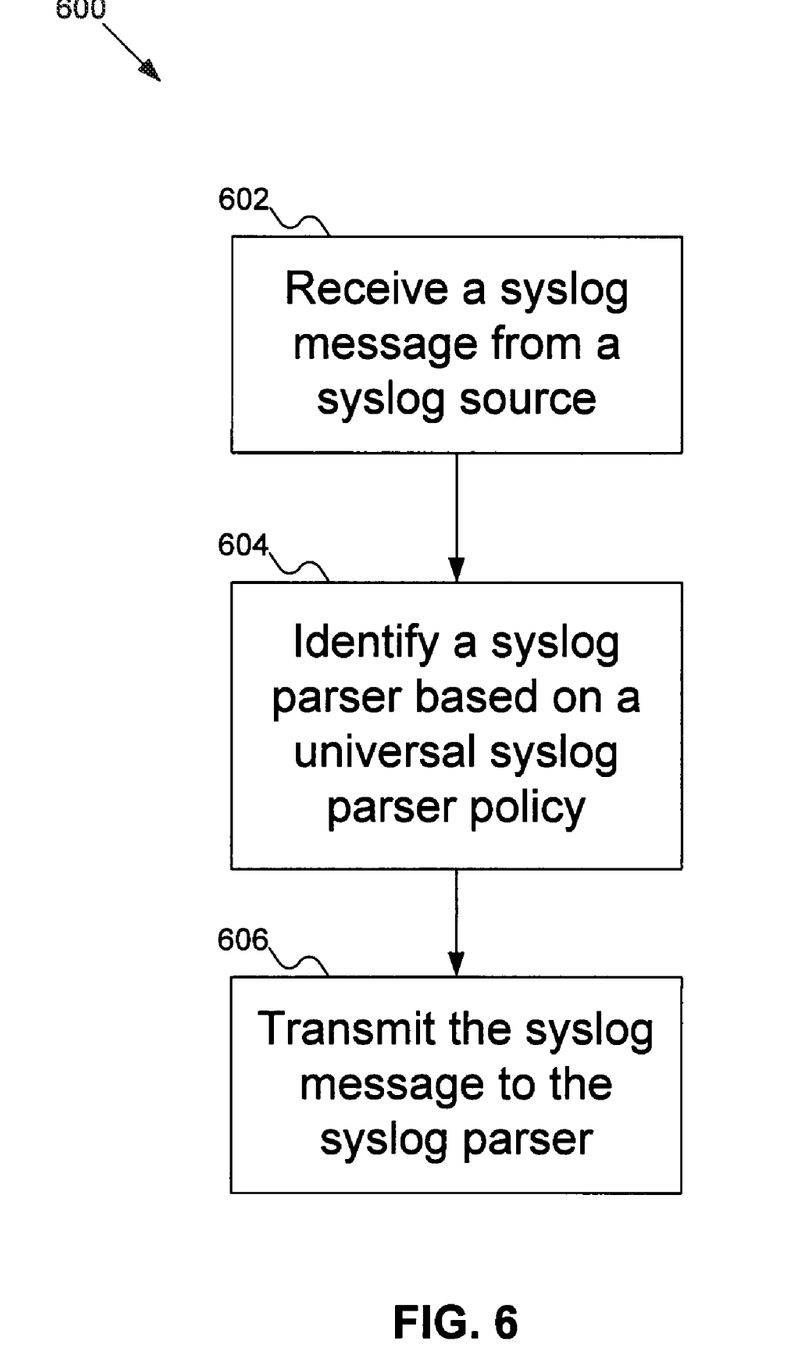
FIG. 6 is a flowchart illustrating a fourth example of a machine-controlled method of routing syslog messages to syslog parsers in accordance with certain implementations of the disclosed technology.

FIG. 6 is a flowchart illustrating a fourth example of a machine-controlled method 600 of routing syslog messages to syslog parsers. In the example, the machine-controlled method 600 includes the application of a universal syslog parser policy as described above.

At 602, the system receives a syslog message from a syslog source.

In the example, the system first identifies a syslog parser based on a universal syslog parser policy, as shown at 604, and then sends the syslog message to the identified syslog parser, as shown at 606. For example, a particular syslog parser can be designated as the universal syslog parser. Such designation can be made in a variety of ways, such as by a specific selection or in a random or pseudo-random fashion. In the example, no other policies are applied. Thus, every syslog message received from a syslog source is sent to the universal syslog parser regardless of any application ID, matching pattern, etc.

Implementations Involving Multiple Syslog Message Routing Policies

Figure 7:
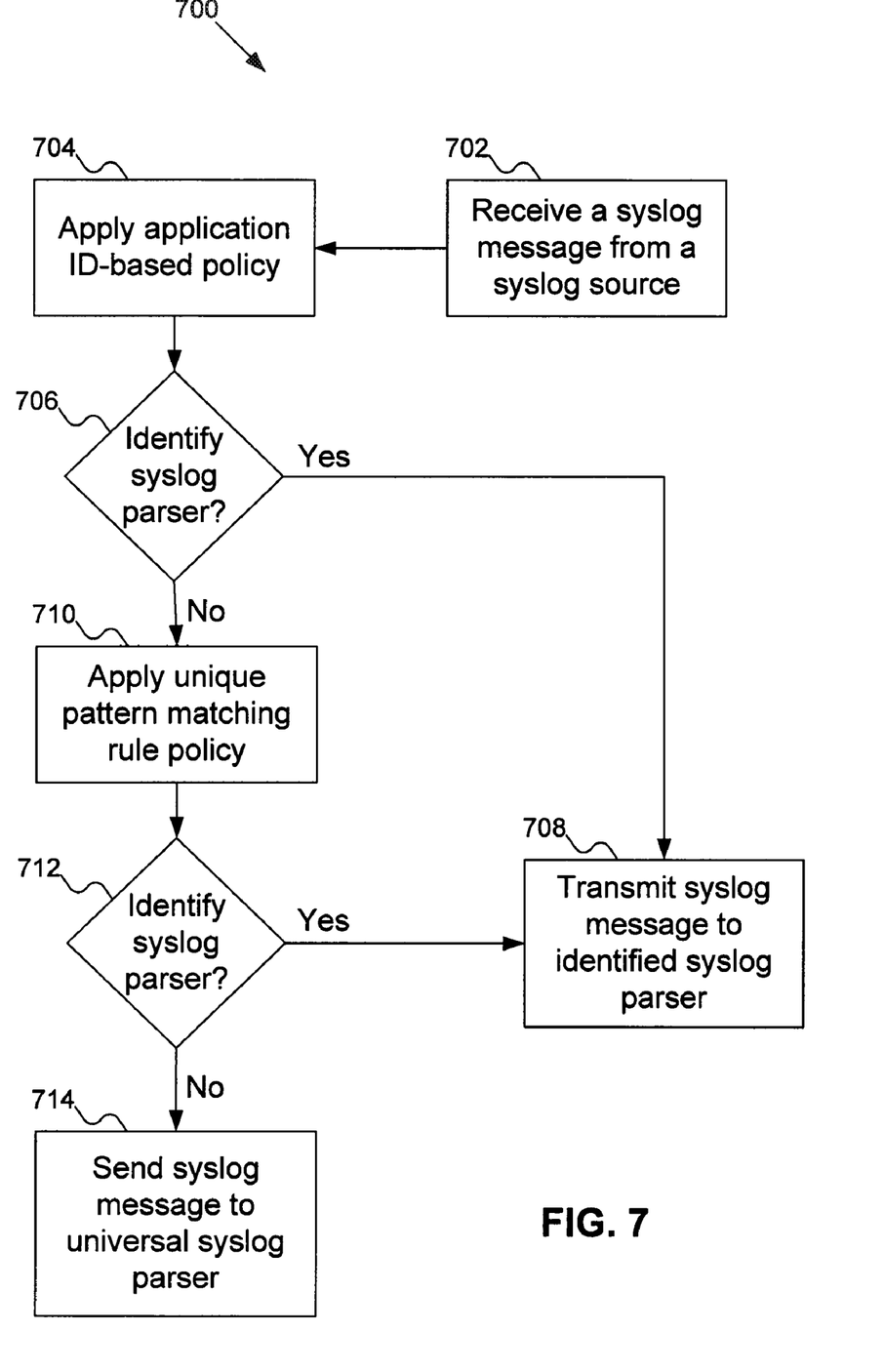
FIG. 7 is a flowchart illustrating a fifth example of a machine-controlled method of routing syslog messages to syslog parsers in accordance with certain implementations of the disclosed technology.

FIG. 7 is a flowchart illustrating a first example of a machine-controlled method 700 of routing syslog messages to syslog parsers using multiple policies. In the example, one or more policies can be applied to a syslog message until a particular syslog parser is identified.

At 702, the system receives a syslog message from a syslog source.

At 704, the system applies an application ID-based policy. The system attempts to identify a particular syslog parser based on the application ID, as indicated at 706. For example, the system can first attempt to identify an application ID within the syslog message and, if an application ID is found, determine whether any of the syslog parsers has a policy indicating that it can handle the syslog message based on the application ID.

If the system identifies a syslog message routing policy indicating that the corresponding syslog parser can handle the particular type of syslog message, the system can then route the syslog message to the identified syslog parser, as shown at 708. However, if the system is unable to find a syslog message routing policy indicating that the corresponding syslog parser can handle the specific type of syslog message, or if the system is unable to identify an application ID within the syslog message body, the system can apply another type of syslog message routing policy, as indicated at 710.

At 710, the system applies a unique pattern matching rule policy. The system attempts to identify a particular syslog parser based on the unique pattern matching rule policy, as indicated at 712. For example, the system can attempt to identify a unique matching pattern within the syslog message, where the matching pattern corresponds to a particular syslog parser type based on the syslog parser's policy. Thus, if the system can identify a unique matching pattern, the system can identify a particular syslog parser corresponding to the identified matching pattern and can then send the syslog message to the identified syslog parser, as shown at 708.

If the system is unable to identify a unique matching pattern and thus a particular syslog parser based on a matching pattern, however, the system can then apply another type of syslog message routing policy, as indicated at 714. For example, the system can apply a universal syslog parser policy.

Figure 8:
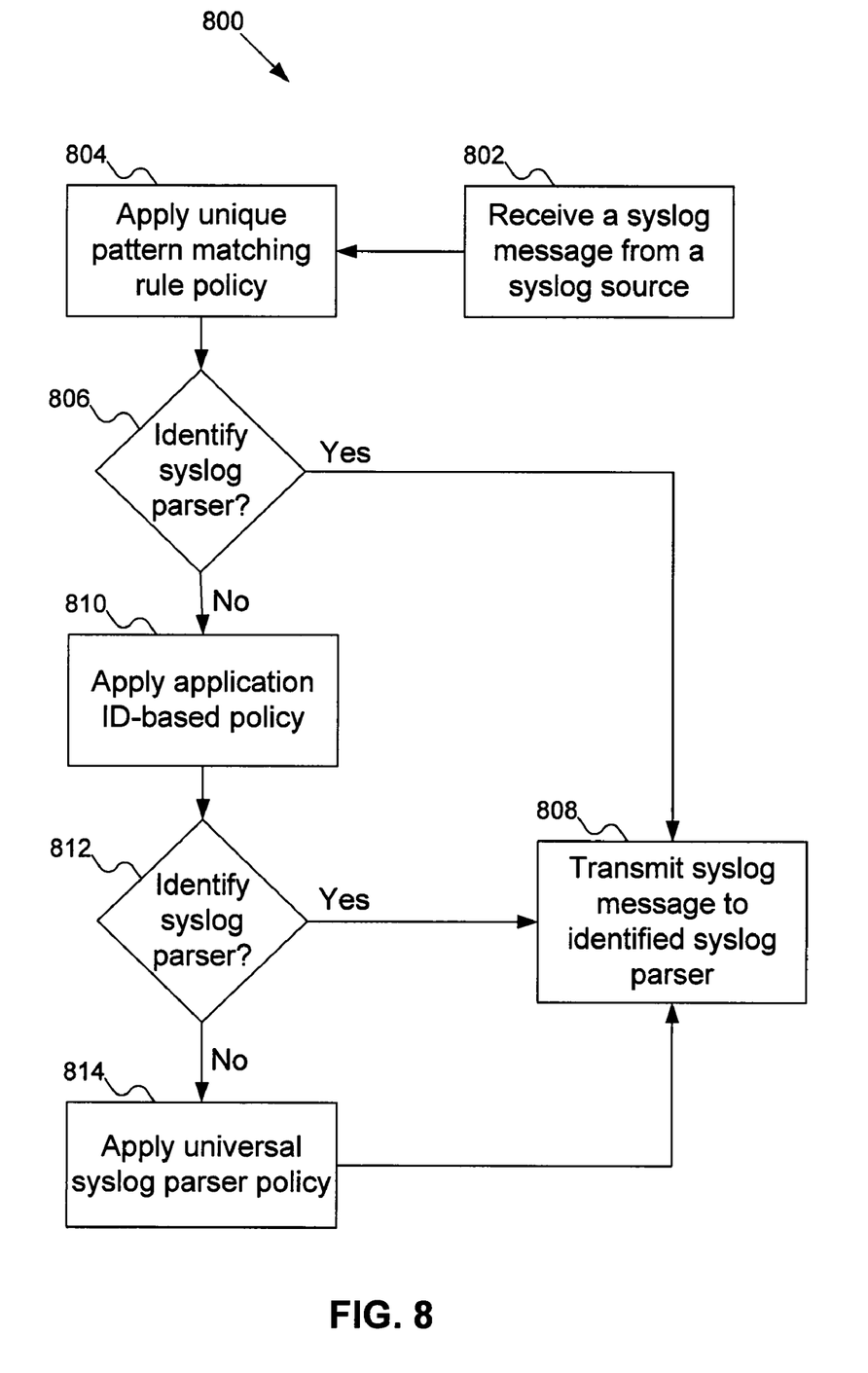
FIG. 8 is a flowchart illustrating a sixth example of a machine-controlled method of routing syslog messages to syslog parsers in accordance with certain implementations of the disclosed technology.

FIG. 8 is a flowchart illustrating a second example of a machine-controlled method 800 of routing syslog messages to syslog parsers using multiple policies. In the example, one or more policies can be applied to a syslog message until a particular syslog parser is identified.

At 802, the system receives a syslog message from a syslog source.

At 804, the system applies a unique pattern matching rule policy to the syslog message. The system attempts to identify a particular syslog parser based on the unique pattern matching rule policy, as indicated at 806. For example, the system can attempt to identify a unique matching pattern within the syslog message. If the system is able to identify a unique matching pattern, the system is thus able to identify a particular syslog parser as the unique matching pattern will be associated with a particular syslog parser based on the syslog parser's policy. The system can then send the syslog message to the identified syslog parser, as shown at 808.

If the system is unable to identify a matching pattern within the syslog message and thus is unable to identify a corresponding syslog parser based on a matching pattern, the system can apply another type of syslog message routing policy. In the example, the system next applies an application ID-based policy, as shown at 810. At 812, the system attempts to identify a particular syslog parser based on an application ID within the syslog message. If the system is able to identify an available syslog parser that corresponds to the identified application ID, the system can then send the syslog message to the particular syslog parser, as shown at 808.

If the system is unable to identify an application ID within the syslog message body, however, or if the system identifies an application ID but is unable to identify a syslog parser corresponding to the identified application ID, the system can apply another type of syslog message routing policy such as a universal syslog parser policy, as indicated at 814. In the example, the system first identifies which syslog parser is presently acting as a universal syslog parser and then sends the syslog message to the identified syslog parser.

One having ordinary skill in the art will appreciate that virtually any combination of the techniques described herein can be used and that such techniques can be arranged in virtually any different order. Thus, one having ordinary skill in the art will readily recognize that the combination and order of techniques in the methods 700 and 800 of FIGS. 7 and 8, respectively, are presented for illustrative purposes and that other methods in accordance with the disclosed technology are not necessarily limited thereto.

Multiple Parsers for Syslog Relays

As discussed above, a syslog relay is a syslog device that acts as an accumulator or concentrator of syslog messages from other syslog devices. A typical syslog relay can forward all kinds of messages from a wide variety of syslog devices. In certain implementations, syslog messages received from syslog relays can be routed using the same techniques applied to syslog messages that are received directly from syslog sources.

However, because each message received from a syslog relay can include a number of syslog messages that each originated at any of a number of different syslog devices, the system can separate the individual syslog messages and route each individual syslog message to a particular syslog parser.

Figure 9:
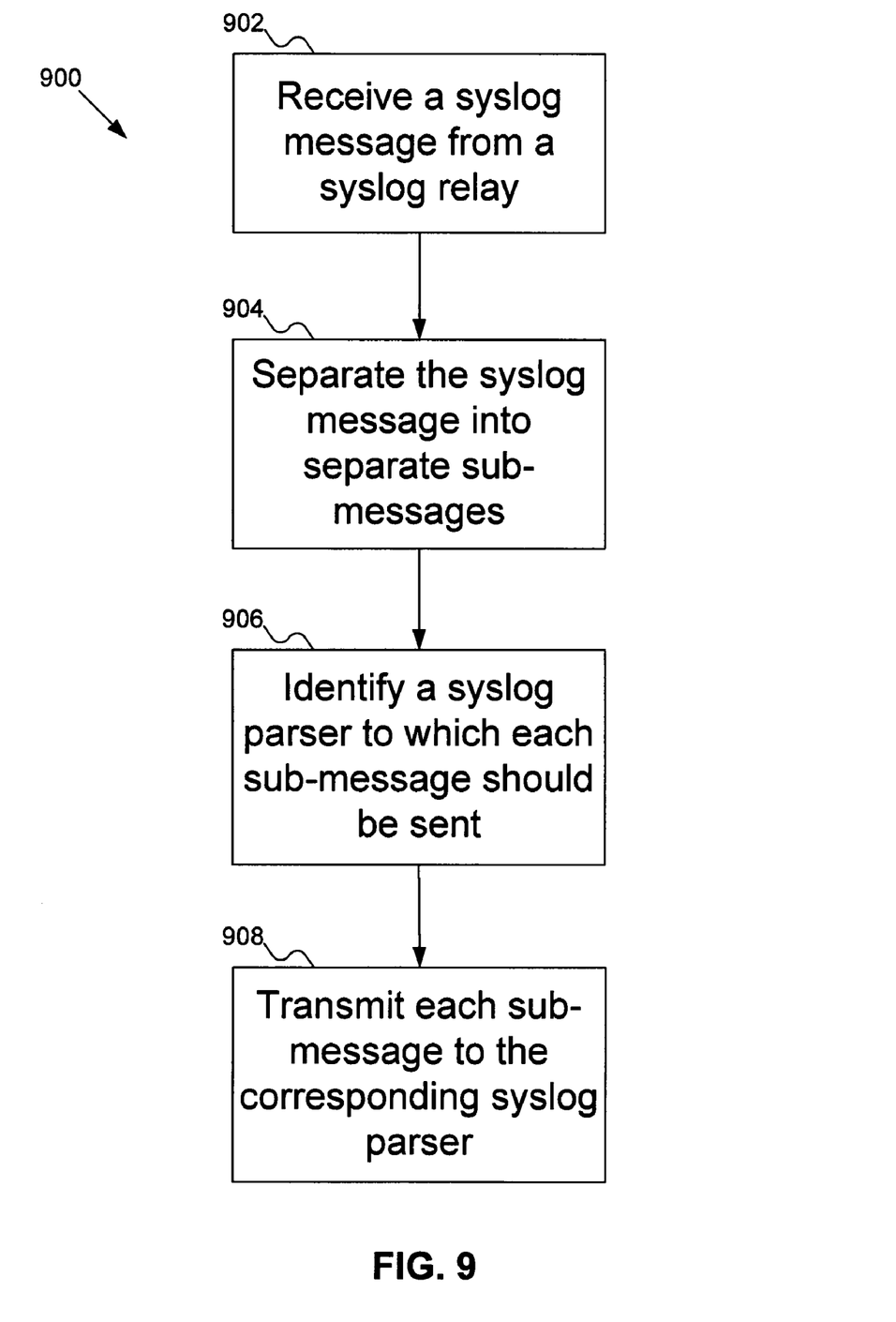
FIG. 9 is a flowchart illustrating an example of a machine-controlled method of routing a syslog message received from a syslog relay to one or more syslog parsers in accordance with certain implementations of the disclosed technology.

FIG. 9 is a flowchart illustrating an example of a machine-controlled method 900 of routing a syslog message received from a syslog relay to one or more syslog parsers.

At 902, the system receives a syslog message from a syslog relay. In the example, the syslog message can represent an accumulation of a number of syslog messages that have been collected from multiple syslog sources.

At 904, the system separates the syslog message into separate sub-messages. The system can separate the syslog message in accordance with any of a number of known techniques for separating syslog messages into sub-messages.

At 906, the system identifies for each sub-message a syslog parser to which the sub-message should be sent. Because the sub-messages may have been collected from a number of different syslog sources, the system may need to apply different policies to each of the sub-messages in order to identify the corresponding syslog parsers. For example, whereas the system may be able to identify destination syslog parsers for certain sub-messages based on application of an application ID-based policy, the system may need to apply a unique pattern matching rule policy to other sub-messages in order to identify the appropriate syslog parsers. In certain scenarios, the system may identify the same syslog parser for each of two or more sub-messages.

At 908, the system sends each of the sub-messages to the corresponding syslog parser. If the system is unable to identify a particular syslog parser for any of the sub-messages, the system can apply a universal syslog parser policy to those sub-messages by sending each of those sub-messages to the universal syslog parser. Thus, the sub-messages will not be lost even if the system is unable to identify a particular syslog parser for the sub-messages by applying application ID-based and/or unique pattern matching rule policies, for example.

In situations where a certain syslog relay does not conform to the formatting and forwarding rules as specified in RFC 3164, the system can deem the syslog relay to not be a valid syslog relay and, as a result, not apply the referenced techniques to the syslog message. In such situations, the system can alert an administrator via an error message, for example, that the syslog relay has been deemed to be not valid.

General Description of a Suitable Machine in Which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an implementation of the disclosed technology" or the like are used herein, these phrases are meant to generally reference implementation or embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A machine-controlled method, comprising:
    receiving a syslog message from a syslog source;
    identifying a particular one of a plurality of syslog parsers for handling the syslog message, wherein the identifying comprises at least one of applying at least one application ID-based policy, applying at least one unique pattern matching rule policy, and applying at least one universal syslog parser policy, wherein said applying comprising determining whether one of said policies applies to the syslog message, and said identifying comprises identifying a particular one of said plurality of syslog parsers that is able to parse said syslog message; and
    transmitting the syslog message to the identified particular one of the plurality of syslog parsers.

2. The machine-controlled method of claim 1, wherein applying the at least one application ID-based policy comprises determining whether an application ID can be identified within the syslog message.

3. The machine-controlled method of claim 2, wherein applying the at least one application ID-based policy further comprises, responsive to determining that the application ID can be identified, determining whether a correlation can be found between the application ID and a capability of the particular one of the plurality of syslog parsers.

4. The machine-controlled method of claim 1, wherein applying the at least one unique pattern matching rule policy comprises determining whether a matching pattern can be identified within the syslog message.

5. The machine-controlled method of claim 4, wherein applying the at least one unique pattern matching rule policy further comprises, responsive to determining that the matching pattern can be identified, identifying the particular one of the plurality of syslog parsers based on the identified matching pattern.

6. The machine-controlled method of claim 2, wherein applying the at least one unique pattern matching rule policy is responsive to determining that no application ID can be identified within the syslog message.

7. The machine-controlled method of claim 3, wherein applying the at least one unique pattern matching rule policy is responsive to determining that no correlation can be found between the application ID and the particular one of the plurality of syslog parsers.

8. The machine-controlled method of claim 6, wherein applying the at least one universal syslog parser policy is responsive to determining that said one of the plurality of syslog parsers cannot be identified by applying the at least one unique pattern matching rule policy.

9. The machine-controlled method of claim 7, wherein applying the at least one universal syslog parser policy is responsive to determining that said one of the plurality of syslog parsers cannot be identified by applying the at least one unique pattern matching rule policy.

10. The machine-controlled method of claim 4, wherein applying the at least one application ID-based policy is responsive to determining that no matching pattern can be identified within the syslog message.

11. The machine-controlled method of claim 10, wherein applying the at least one universal syslog parser policy is responsive to determining that said one of the plurality of syslog parsers cannot be identified by applying the at least one application ID-based policy.

12. The machine-controlled method of claim 1, further comprising providing at least one of a new application ID-based policy, a new unique pattern matching rule policy, and a new universal syslog parser policy corresponding to a new syslog parser.

13. The machine-controlled method of claim 12, wherein the providing is automatic in response to an addition of the new syslog parser to the plurality of syslog parsers.

14. The machine-controlled method of claim 1, wherein applying the at least one universal syslog parser policy comprises identifying a designated universal syslog parser, wherein the designated universal syslog parser is the particular one of the plurality of syslog parsers.

15. A machine-controlled method, comprising:
    determining whether a particular one of a plurality of syslog parsers can be identified as capable of parsing a syslog message based at least in part on an application ID within the syslog message;
    responsive to determining that the particular one of the plurality of syslog parsers can be identified based at least in part on the application ID, identifying the particular one of the plurality of syslog parsers and sending the syslog message to the identified particular one of the plurality of syslog parsers;
    responsive to determining that the particular one of the plurality of syslog parsers cannot be identified based at least in part on the application ID, determining whether the particular one of the plurality of syslog parsers can be identified based at least in part on a matching pattern within the syslog message; and responsive to determining that the particular one of the plurality of syslog parsers can be identified based at least in part on the matching pattern, identifying the particular one of the plurality of syslog parsers and sending the syslog message to the particular one of the plurality of syslog parsers.

16. The machine-controlled method of claim 15, further comprising, responsive to determining that the particular one of the plurality of syslog parsers cannot be identified based at least in part on the matching pattern, identifying a universal syslog parser and sending the syslog message to the universal syslog parser.

17. The machine-controlled method of claim 16, further comprising receiving the syslog message from a syslog relay.

18. The machine-controlled method of claim 17, further comprising separating the syslog message into a plurality of sub-messages.

19. An apparatus, comprising:
   a processor;
   a syslog message receiving module operable to receive a syslog message from a syslog source;
   an application ID-based policy application module operable to identify a particular one of a plurality of syslog parsers based at least in part on an application ID identified within the syslog message; and
   a unique pattern matching rule policy application module operable to identify the particular one of the plurality of syslog parsers based at least in part on a matching pattern identified within the syslog message; and
   a universal syslog parser policy application module operable to identify the particular one of the plurality of syslog parsers based at least in part on a universal syslog parser designation associated with the particular one of the plurality of syslog parsers; and
   a syslog message transmission module operable to transmit the syslog message to the identified one of the plurality of syslog parsers.

20. The apparatus of claim 19, wherein the syslog message receiving module is operable to receive the syslog message from the syslog source through a syslog relay.

* * * * *